Sept. 7, 1948. F. E. SWAIN 2,448,747
PIPE COUPLING
Filed April 3, 1945

Inventor
Frank E. Swain
by Mawhinney & Mawhinney
Attorneys

Patented Sept. 7, 1948

2,448,747

UNITED STATES PATENT OFFICE 2,448,747

PIPE COUPLING

Frank Edward Swain, Ewell, England, assignor of one-half to Douglas Darby, Northwood, Middlesex, England Application April 3, 1945, Serial No. 586,384
In Great Britain January 12, 1945

3 Claims. (Cl. 285—84)

The main object of the present invention is to provide an improved method of, and means for, securing a hollow adaptor or other rigid member in the end of a rubber or like flexible hose, which may, if desired, be reinforced with fabric, wires or the like.

A further object is to ensure that the rubber will not spew out at the end of the hose when the said rigid member is secured in position—particularly in the case of a flexible hose which is reinforced externally in the manner described in my application No. 569,947, filed December 27, 1944, now Patent No. 2,424,863, where there is a tendency for the rubber to spew out between the part-spherical washers at the end and thereby to spread them.

Figure 1:
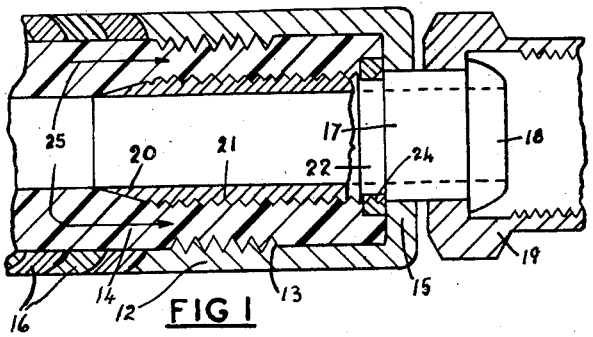
Figure 1 is a sectional elevation of one construction according to the invention.

The method of the invention broadly involves securing on to the end of the hose 14 a rigid sleeve 12 having a flange 15 abutting the end of the hose but not extending radially inwardly as far as the bore of the hose when the latter is undeformed, providing a screw-thread 21 on the surface of the hollow adaptor or other rigid member 17, screwing the latter into the end of the hose, and using a circlip 23a or a washer 23 with a tapped hole acting between the axially-inner face of the flange 15 of the sleeve 12 and a wall of a groove 22 in the periphery of the member 17 axially to locate the latter.

In a preferred construction the rigid sleeve 12 is secured on the end of the hose by being screwed thereon, this screw-thread being of opposite hand to the screw-thread 21 provided on the periphery of the rigid member 17. Purchase can therefore be provided between these two parts when the said rigid member is being screwed into position. Obviously, the said rigid member will be given a tapered end to facilitate its entry into the bore of the hose-end.

Referring now to the drawings in greater detail, in Figure 1 the rigid sleeve 12 is provided with a screw-thread 13 by means of which it can be screwed upon the end of the flexible hose 14 until its flange 15 abuts the end of the flexible hose. The latter is externally reinforced in the manner disclosed in the application above-mentioned, 16, 16 representing some of the part-spherical reinforcing washers. The rigid member 17, which in this case is hollow and is provided with a head 18 to receive an attachment nut indicated at 19, has a tapered inner end 20 and a screw-threaded external periphery 21, the screw-thread terminating adjacent a peripheral groove 22 provided in the member 17—which, it will be observed, is a sliding fit in the bore of the flange 15. Furthemore, the latter does not extend radially inwardly as far as the bore of the flexible hose when the latter is uncompressed.

The thread 21 is, as stated, of opposite hand to the thread 13.

In the construction of Figure 1, for axial location purposes use is made of a washer 23 which is inserted at or in the end of the bore of the flexible hose before the sleeve 12 is secured to the end of the hose. The hole of the washer is tapped, as shown at 24, to receive the screw-thread 21. In consequence, the member 17 can be screwed through the washer into the bore of the flexible hose, thereby compressing the material of the latter against the internal periphery of the sleeve 12 until the washer reaches the peripheral groove 22. Thereupon further rotation of the member 17 in the same direction will tend to draw the material of the hose axially in the direction of the arrows 25. This will assist in increasing the compression of the material of the end of the hose and in causing it to spew completely throughout the interior of the sleeve 12, i. e., right up to the flange 15. The washer, being of larger diameter than the bore of the flange 15, interacts between the axially-inner face thereof and the opposite wall of the peripheral groove 22 to prevent the axial withdrawal of the member 17.

Figure 2:
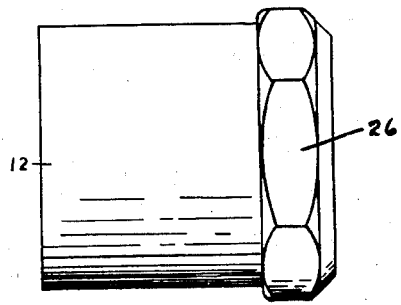
Figure 2 is an elevation of an alternative form of rigid sleeve.

To facilitate screwing the latter into position as aforesaid, the sleeve 12 may be provided with a hexagonal or other non-circular periphery, as indicated at 26 in Figure 2.

Figure 3:
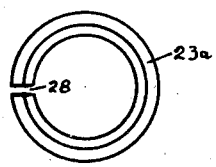
Figure 3 is a cross-section of a circlip when used instead of the washer of Figure 1, Figure 4 being an end elevation thereof.
Figure 4:
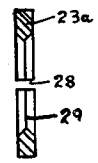

In the alternative of Figures 3 and 4, the circlip 23a having a gap 28 in it can be inserted into the interior of the sleeve 12 before this is secured to the end of the hose or, alternatively, if preferred, it may be compressed and inserted through the bore of the flange 15 after the sleeve has been secured in position. Its inner periphery is provided with a sharp-edged ridge 29 which is shaped so as to engage the screw-thread 21 of the member 17 when this is being screwed through it, in which conditions the circlip will, as will be well understood, adopt a helical shape dependent upon the pitch of the screw-thread 21. When the member 17 has been completely screwed into position to bring the circlip into engagement with its peripheral groove, which in this case is of slightly less axial dimension than the corresponding groove 22 of Figure 1, in order just to receive the circlip, the latter provides axial location for the member 17 against withdrawal.

As will be well understood, it is preferable to make use of an appropriate lubricant when screwing on the sleeve 12 or when screwing in the member 17.

What I claim as my invention and desire to secure by Letters Patent of the United States is:

1. In combination with the end of a flexible hose, a rigid sleeve screwed thereon, said sleeve having a flange abutting the end of the hose but not extending radially inwardly as far as the bore of the hose when uncompressed, a rigid member screwed into the end of the hose, the screw-threads of said sleeve and member being of opposite hands, and a ring the internal periphery of which is shaped to receive the screw-thread on said member, said ring disposed in the end of the hose and interacting between the axially-inner face of said flange and a peripheral groove of said member.

2. In combination with the end of a flexible hose, a rigid sleeve screwed thereon, said sleeve having a flange abutting the end of the hose but not extending radially inwardly as far as the bore of the hose when uncompressed, a rigid member screwed into the end of the hose, the screw-threads of said sleeve and member being of opposite hands, and a spring ring disposed in the end of the hose and interacting between the axially-inner face of said flange and a peripheral groove of said member to axially locate said member.

3. In combination with the end of a flexible hose, a rigid sleeve screwed thereon, said sleeve having a flange abutting the end of the hose but not extending radially inwardly as far as the bore of the hose when uncompressed, and a rigid hollow member screwed into the end of the hose and extending through the opening of said flange with a sliding fit, the screw-threads of said sleeve and member being of opposite hands whereby by turning said sleeve and member with respect to one another the hose end can be drawn in to fully occupy all the space between said sleeve and member.

FRANK EDWARD SWAIN.

REFERENCES CITED

The following references are of record in the file of this patent:

UNITED STATES PATENTS

| Number | Name | Date |
|---|---|---|
| 806,135 | Greenfield | Dec. 5, 1905 |
| 2,314,890 | Melsom | Mar. 30, 1943 |
| 2,333,349 | Weatherhead | Nov. 2, 1943 |
| 2,401,921 | Fisher | June 11, 1946 |